INVENTOR
A. H. BOBECK
BY Herbert M. Shapiro
ATTORNEY

United States Patent Office 3,447,140

Patented May 27, 1969

3,447,140 MAGNETIC MEMORY USING A BIPOLAR WORD PULSE DURING A WRITE OPERATION

Andrew H. Bobeck, Chatham, N.J., assignor to Bell Telephone Laboratories, Incorporated, New York, N.Y., a corporation of New York Filed Oct. 4, 1965, Ser. No. 492,557
Int. Cl. G11b *5/00*
U.S. Cl. 340—174 7 Claims

ABSTRACT OF THE DISCLOSURE

Thin magnetic film memories exhibit improved outputs if a bipolar word pulse is employed during a write operation. Such a pulse permits a relatively large amount of flux to be tipped to a selected direction along the easy axis when terminated in the presence of an easy direction field.

This invention relates to magnetic memories and, more particularly, to such memories operated in the rotational mode.

The term "rotational mode" of operation of magnetic memories characterizes the rotation of flux from first and second directions along an easy axis to a hard direction in response to a hard direction field and the "tipping" of that flux to the first or second direction along the easy axis in response to a small easy direction field as the hard direction field terminates. Discrete spot thin film memories, for example, are operated in this manner as is well known.

It is equally well known that for each film spot a variety of hard and easy axis directions exist, the nominal hard and easy axes representing the mean directions. This spread of hard and easy axes is called "hard (or easy) axis dispersion" and is desirably minimized or at least controlled (in specific instances) in accordance with prior art teaching. The reason advanced for minimizing the dispersion is that the greater the dispersion the greater the required tipping field in the easy direction, because flux at a relatively large angle to the mean easy axis has a tendency to relax to an inappropriate direction along the easy axis as a hard direction field is removed, as is well known, thus diminishing the output signal in response to a later "read" pulse. Such a tendency may be countered by a relatively large easy direction field. Such large fields, however, are provided by pulses in digit conductors of the memory and, accordingly, are desirably small to minimize loss of information from nonselected spots along a pulsed digit solenoid.

Accordingly, one object of this invention is a "rotational mode" magnetic memory wherein relatively large output signals are realized.

The foregoing and further objects of this invention are realized in one embodiment thereof wherein flux in a discrete spot thin film memory is driven to first and second directions along an easy axis in response to a first hard direction field followed by a second hard direction field of the opposite polarity and relatively low amplitude accompanied by an overlapping small easy direction field. In this manner, a greater amount of flux is available for providing relatively large output signals during a later read operation. Since such memories are frequently driven by, for example, biased core, charge storage diode, or transformer type access switches which, by nature, provide bipolar "word" (hard direction) pulses, the second hard direction field is provided with little extra cost.

Accordingly, a feature of this invention is a magnetic thin film memory including means for providing a hard direction field of a first polarity followed by a hard direction field of a second polarity and smaller amplitude accompanied by an overlapping small amplitude easy direction field.

The foregoing and further objects and features of this invention will be understood more fully from a consideration of the following detailed description rendered in conjunction with the accompanying drawing, in which.

Figure 1:
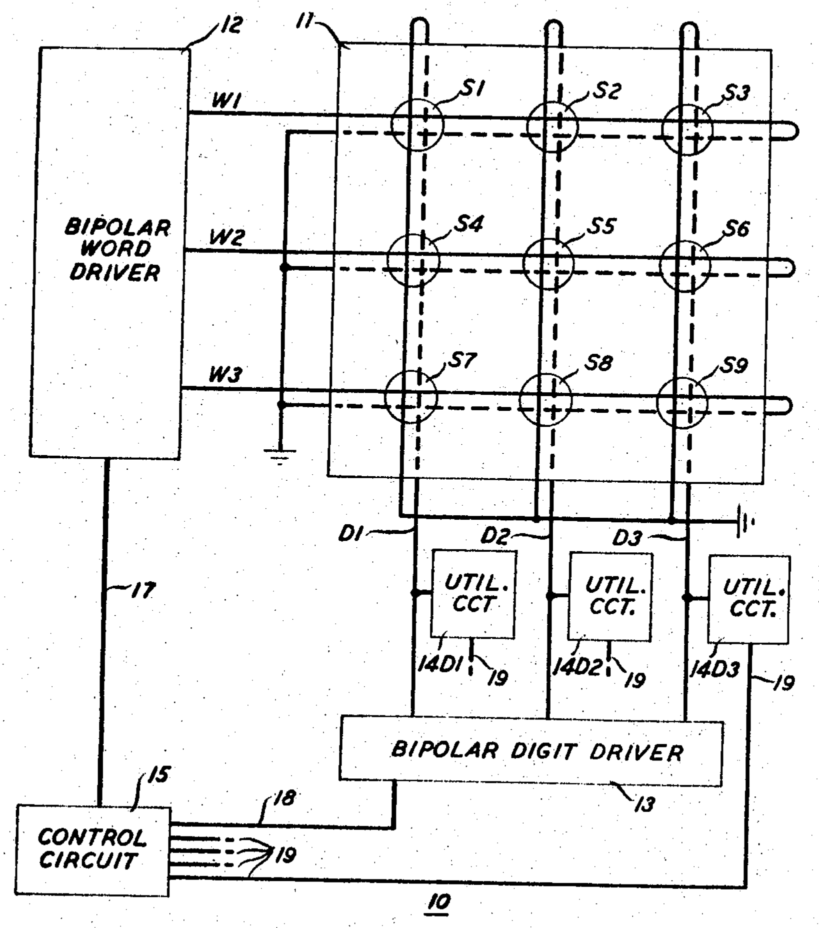
FIG. 1 is a schematic illustration of a discrete spot thin film memory in accordance with this invention.
Figure 5:
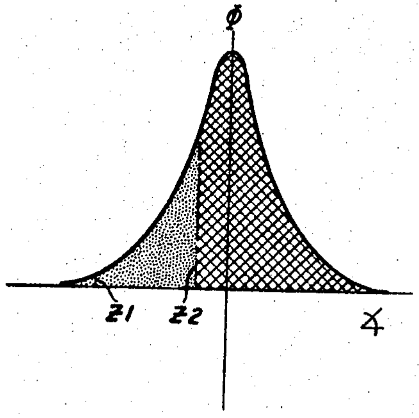
Figure 2:
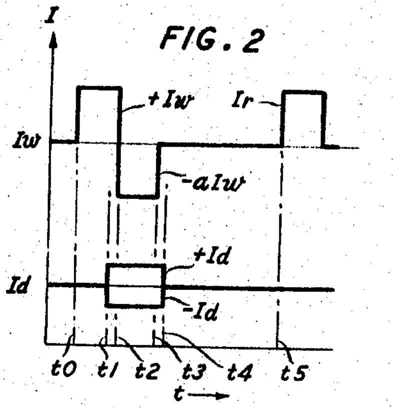
FIG. 2 is a graph illustrating the pulses applied to the memory of FIG. 1 during operation thereof.

FIGS. 3A, 3B, 3C, and 3D, and 4A, 4B, 4C, and 4D are schematic illustrations of representative portions of the memory of FIG. 1 showing flux rotation therein in response to the pulses shown in FIG. 2; and FIG. 5 is a graph of flux versus the skew angle in the representative portion of the memory of FIG. 1 further representing flux switched in accordance with this invention during operation.

Specifically, FIG. 1 shows a discrete spot thin film memory 10 comprising a plurality of thin film spots, designated S1 through S9 for an illustrative nine bit word-organized memory. The spots are deposited, by well known techniques, on a suitable substrate 11, for example, glass. A plurality of word solenoids represented by horizontal lines designated W1, W2, and W3 overlie all the spots corresponding row providing return paths on the other side of the substrate. The word solenoids are connected between a bipolar word driver 12 and ground. Similarly, a plurality of digit solenoids D1, D2, and D3 overlie all the spots in corresponding columns providing return paths on the other side of the substrate. The digit solenoids are connected between a digit driver 13 and individual utilization circuits, 14D1, 14D2, and 14D3, at one end and ground at the other. Word and digit drivers 12 and 13 and utilization circuits 14D1, 14D2, and 14D3 are connected to a control circuit 15 via conductors 17, 18, and 19, respectively. The various drivers and circuits described herein may be any such elements capable of operating in accordance with this invention.

The memory illustrated in FIG. 1 is operated on a word-organized basis in response to a sequence of drive pulses shown, illustratively, in FIG. 2. That operation may be most easily understood by following that sequence of pulses and considering flux configurations in a representative spot in the memory in response thereto. For convenience, the flux configurations in accordance with this invention are compared to flux configurations achieved in accordance with prior art operation. The latter are depicted in FIGS. 3A through 3D, the former in FIGS. 4A through 4D.

Figure 3A:
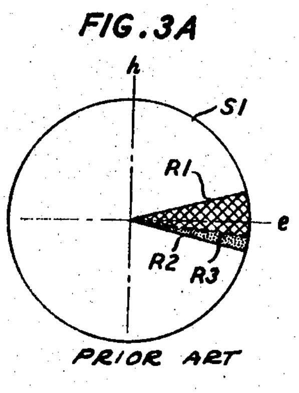
Figure 4A:
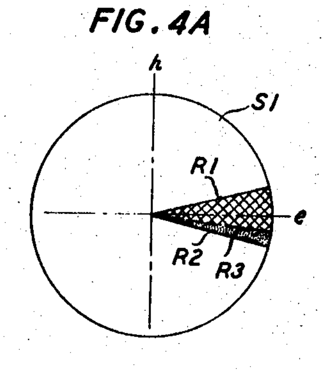
PRIOR ART FIG. 4A

FIGS. 3A and 4A depict a representative thin film spot S1 wherein mean easy and hard axes are illustrated by horizontal and vertical broken lines as viewed in the figures and there designated *e* and *h*, respectively. Each of those figures also shows easy axis flux dispersion between two limits symmetrically about the mean easy axis represented by radii R1 and R2. That area defined between radius R2 and the broken line representing the mean easy axis is shown equally divided by a radius R3 as is explained further hereinafter. Flux in the representative spot is assumed initially to be directed generally to the right as represented by the area defined between radii R1 and R2. Flux in this direction is assumed to represent a stored binary one. Flux directed in the opposite direction within similar limits is assumed to represent a stored binary zero.

Figure 3B:
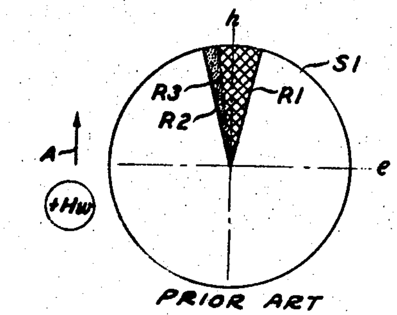

In operation, a positive pulse is applied, at a time designated $t0$, to word solenoid W1 by word driver 12 under the control of control circuit 15. Such a pulse is represented in FIG. 2 by a pulse form designated $+Iw$ and results in a rotation of flux from the easy axes to a direction along the mean hard axis *h* upward as viewed in FIGS. 3B and 4B. The relative orientations of the various radii as viewed are explained hereinafter. The field generated by the pulse is represented by the encircled +H*w* to the left of the representation of the representative thin film spot in the figures. An arrow A shows the direction (upward as viewed) of the field generated by the pulse. At a time designated *t*1 in FIG. 2, before the pulse +I*w* terminates, a small digit pulse is applied in a well known manner. That digit pulse is followed at a time designated *t*2 by a negative pulse on the trailing edge of the word pulse, the latter terminating first. Such pulses are applied via solenoids D1 and W1 by drivers 13 and 12, respectively, under the control of control circuit 15. For the following description, it is assumed that the digit pulse is positive for generating a digit field tipping flux to the rght as viewed in FIG. 3A. Such a pulse is represented by the positive waveform designated +I*d* in FIG. 2 and the field generated by that pulse is represented by the encircled +H*d* to the left of the representation of the representative spot S1 as shown in FIG. 4C. The direction of the digit (tipping) field is shown by the arrow designated A*d* directed to the right as viewed in that figure. The concurrent negative pulse on the word solenoid is represented by the negative waveform designated —*a*I*w* in FIG. 2 and the field generated by that pulse is represented by the encircled —*a*H*w* in FIG. 4C. The direction of the field generated by that pulse is represented by the downward directed arrow designated A*w* in FIG. 4C. In response to coincident negative word pulse —*a*I*w* and positive digit pulse +I*d*, flux in the representative spot is rotated generally to the opposite direction along the hard axis, that is to say, generally downward as viewed in FIG. 4C. The configuration of FIG. 4C is explained further hereinafter. The pulse *a*I*w* terminates, at a time designated *t*3 in FIG. 2, prior to the termination of the digit pulse which terminates at a time designated *t*4. Ideally, all available flux is rotated to the right as viewed in FIG. 4D when the digit pulse +I*d* is terminated. At a still later time, designated *t*5 in FIG. 2, a read pulse is applied to word solenoid W1 by means of word driver 12 again under the control of control circuit 15. Such a pulse, designated I*r* in FIG. 2, may be a next succeeding positive word pulse +I*w* as is usually the case in practice. Flux in response to the read pulse is rotated upward as viewed in FIG. 4B coupling a corresponding digit solenoid to provide a positive pulse therein in a known manner for detection by utilizaton crcuit 14D1 under the control of control circuit 15.

Figure 3C:
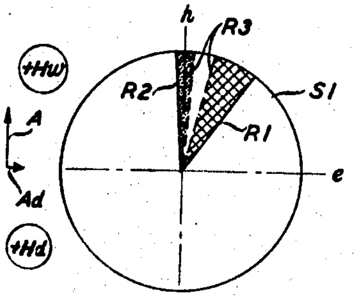
Figure 3D:
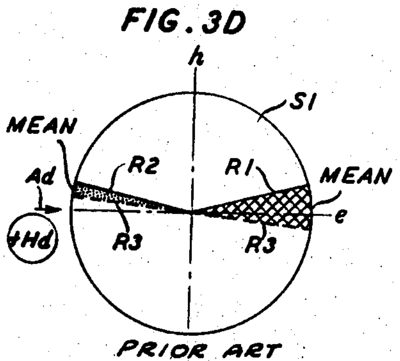

The relatively large amount of flux rotated to the appropriate direction along the easy axis in accordance with this invention is evident when compared to the amount of flux so rotated in accordance with prior art teaching. To facilitate such a comparison, the area of easy axis dispersion in FIGS. 3A through 3D and 4A through 4D is divided by radius R3 into stippled and crosshatched areas. In response to positive word pulses, rotation to a direction along the mean hard axis is identical for operation in accordance with the prior art and for operation in accordance with this invention. The prior art teaches to apply a digit pulse alone before the termination of that positive word pulse. The digit pulse, if of positive polarity, tips clockwise to the right as viewed, the flux represented by that portion of the crosshatched area shown in FIG. 3B to the right of the mean hard axis position *h*. In addition, that digit pulse tips clockwise that flux represented by half the area to the left of that position defined between the mean hard axis position and radius R3. That last-mentioned area is also shown crosshatched in FIG. 3B. But some flux is insufficiently influenced by that digit pulse to rotate clockwise to the right. This is clear when it is recalled that film easy and hard axes are orthogonal to one another and that when a dispersion of film easy axes exists, so does a corresponding dispersion of film hard axes. A field tending to rotate flux upward (as viewed) to a mean hard axis, then, rotates some flux, the easy axis of which is initially oriented, for example, along radius R1, only partially towards its corresponding hard axis. This is not only because the corresponding hard axis is on the opposite side of the mean hard axis from the direction of the easy axis along radius R2 but also because a clockwise anisotropy torque (easy direction pull) is superimposed on the hard direction field. Similarly, flux directed along radius R3 is rotated, it is assumed, slightly beyond its corresponding hard axis, then experiencing a counterclockwise anisotropy torque. Flux initially directed along radius R2 is rotated well beyond its corresponding hard axis. Flux initially directed along radius R1 relaxes clockwise when the hard direction field terminates because of the clockwise anisotropy torque and the tipping field. It is assumed that the clockwise tipping (digit) field is just sufficient to overcome the counterclockwise anisotropy torque acting on flux initially oriented along radius R3 for rotating that flux clockwise. That flux initially directed along radius R2, however, rotates slightly clockwise in response to the tipping field as shown in FIG. 3C but ultimately rotates counterclockwise in response to the anisotropy torque when the hard direction field and the tipping field terminate. The last-mentioned flux is represented as the stippled "dispersion" area in the various figures. Thus, the stippled area represents flux which rotates counterclockwise at the trmination of the hard direction (and tipping) field. The crosshatchd area represents the flux rotated clockwise. The flux divides at radius R3 which may be thought of as a boundary of an area representing flux rather than a direction of flux in this connection. The stable position for the flux so rotating is shown in FIG. 3D. It is noted that the relative orientations of radii R3 and R1 and radii R3 and R2 in FIG. 3D are opposite to the orientations shown therefor in FIGS. 3B and 3C. This is clear when it is realized that the flux in those directions returns to corresponding easy axes when all fields are removed.

At the termination of the digit pulse +I*d* in accordance with prior art teaching then, the flux tipped clockwise to the right (the crosshatched area) is in an appropriate direction along the easy axis. That flux (the stippled area) little influenced by the digit pulse (tipping field) rotates generally to the opposite direction along the easy axis about some new mean film easy direction for the flux represented by the stippled area alone. The mean easy axes for the stippled and crosshatched areas individually are shown in FIG. 3D. The stippled area represents flux which not only is not rotated properly to an orientation for augmenting flux coupling during a read operation but is rotated to an orientation for providing opposing flux coupling during that operation.

Figure 4B:
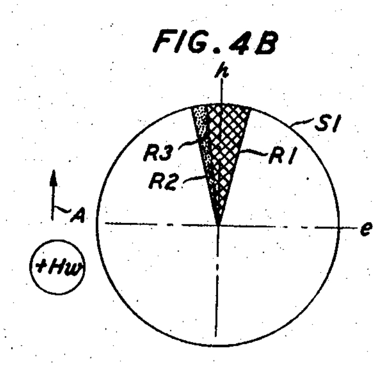
PRIOR ART FIG. 4B
Figure 4C:
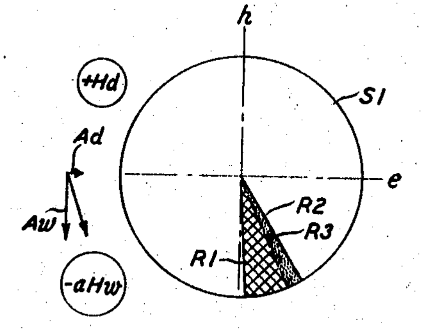
PRIOR ART FIG. 4C

In accordance with the present invention, the flux orientations shown in FIGS. 3C and 3D pertain as flux reorients from the configuration shown in FIG. 4B to that shown in FIG. 4C. This is due to the fact that the digit pulse +I*d* is applied before the positive word pulse terminates and before the negative word pulse —*a*I*w* is applied. That negative word pulse, however, when applied, is of an amplitude to rotate the flux represented by the stippled area in FIG. 4B to the opposing direction along the hard axis, that is, counterclockwise to a generally downward direction as shown in FIG. 4C. The same negative word pulse rotates flux represented by the crosshatched area clockwise also to the downward direction. Since that negative word pulse is applied concurrently with the digit pulse +I*d*, the downward direction to which flux is now driven is determined by the vector sum of those two pulses and the anisotropy torque on the various flux components. For binary ones, the various fields orient the flux to the right of the (downward) mean hard axis in a flux distribution comparable to that shown in FIG. 3B and discussed in connection with that figure. It is clear from FIG. 4C that the flux represented by the stippled area is rotated beyond corresponding hard axes and relaxes counterclockwise to the right under the influence of the anisotropy torque when the digit pulse +I*d* terminates. It is also clear that some of the flux represented by the crosshatched area in FIG. 4C is rotated clockwise beyond corresponding hard axes. The tipping field and the anisotropy torque, however, are sufficient to rotate that last-mentioned flux counterclockwise to the proper direction along the easy axis when the negative word pulse terminates. Thus, the flux represented by the stippled area is rotated properly now.

The radii R1 and R3 shown in FIG. 4D again change relative orientations as is clear from a comparison between FIGS. 4D and 4C. The reason for this is that the vector sum of fields —*a*H*w* and +H*d* as shown in FIG. 4C tend to drive all flux in the direction of the resultant field. That resultant field, however, necessitates flux oriented along R1 in FIG. 3D to rotate beyond its corresponding hard axis whereupon a clockwise anisotropy torque is experienced thereby. Flux oriented along radius R3 (to the right in FIG. 3D) need not so rotate beyond the corresponding hard axis in response to the resultant field and thus experiences a counterclockwise anisotropy torque. It is these clockwise and counterclockwise anisotropy torques which determine the spread of flux about a resultant field, importantly in accordance with this invention in connection with FIG. 4C, and also in connection with FIGS. 3B and 4B.

Consequently, that flux represented by the stippled area in FIG. 4C is rotated to augment output signals during a later read operation in accordance with this invention.

A binary zero is stored in accordance with this invention by employing a digit pulse of opposite polarity to that described for the storage of a binary one. A pulse for so storing a zero is represented in FIG. 2 by the negative waveform designated —I*d*. In response to such a pulse applied concurrently with a negative word pulse —*a*I*w* flux rotates from the position represented in FIG. 4B through that shown in FIG. 3C to that shown in FIG. 4C except that the stippled and the crosshatched areas in those figures are reversed. The ultimate position for the flux is exactly the opposite of that shown in FIG. 4D. That is to say, ideally all the flux is directed along the easy axis to the left as viewed. The term "ideally" is used herein because some flux still may rotate to the inappropriate direction even when a thin film memory is operated in accordance with this invention. This may be appreciated by a consideration of FIG. 5 which shows a plot of flux versus the skew angle which local magnetic areas of representative film spot S1 assume with respect to the mean easy axis. The resulting distribution curve decays from a peak at zero angle and approaches zero as the (±) angle increases. The crosshatched area under the curve represents that amount of flux rotated by a digit pulse and a positive hard direction pulse alone in accordance with prior art teaching. The stippled area represents that amount of flux, in addition to that represented by the crosshatched area, which is rotated in accordance with this invention. In practice most of the flux represented by the stippled area is rotated. Some, however, with film axes directed at increasingly large (±) angles will not be so rotated. The vertical lines designated Z1 and Z2 demarcate a finite portion of the stippled area which corresponds to a practical amount of additional flux rotated in accordance with this invention.

The memory of FIG. 1, as is clear, is word-organized. Thus binary ones and zeros are written into and read out of a plurality of thin film spots simultaneously. Each of those spots, however, is driven exactly as described for the representative spot and flux therein responds as described. For example, a binary word 010 may be written into the spots S1, S2, and S3 by applying a positive pulse +I*w* to word solenoid W1 followed by a lower amplitude negative pulse —*a*I*w*. A negative digit pulse —I*d* is applied to digit solenoids D1 and D3 and a positive digit pulse +I*d* is applied to digit solenoid D2 as pulse +I*w* terminates. The digit pulses remain applied until after the negative word pulse terminates. The word 010 is now stored. A subsequent positive word pulse (read pulse) provides a negative pulse in each of digit solenoids D1 and D3 and a positive pulse in digit solenoid D2 for parallel detection by utilization circuit 14D1, 14D2, 14D3.

It has been pointed out hereinbefore that the positive word pulse has an amplitude usually much larger than that of the negative word pulse in accordance with this invention. The amplitude of the positive word pulse is large to insure rotation of all flux to directions along the mean hard axis as shown in FIG. 3B or FIG. 4B. This is consistent with prior art teaching to permit tipping with equal facility to either direction along the easy axis. The negative word pulse in accordance with this invention, however, is much smaller to avoid symmetrical distribution about the hard axis as shown in FIG. 4C. In this manner the (tipping) digit field rotates relatively more flux to the appropriate direction along the easy axis. Relatively low amplitude negative word pulses in accordance with this invention are about 50 percent of the amplitude of the positive word pulse. Duration thereof is determined by cycle time considerations consistent with prior art operation. It is clear from a comparison between FIGS. 3C and 4D that "creep" and "disturb" effects are reduced in accordance with this invention also.

Figure 4D:
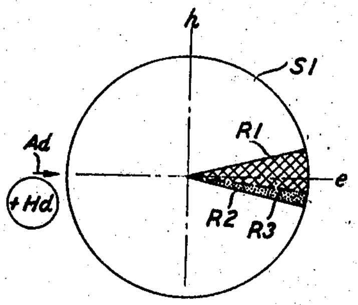
PRIOR ART FIG. 4D

It has been found in practice that the negative word pulse in accordance with this invention need not follow the positive word pulse immediately but may be delayed as long as may be desired because the flux pattern achieved by a positive word pulse with a digit pulse applied as the former terminates produces a stable flux pattern as shown in FIG. 3D. A latter applied negative word pulse and coincident digit (the same or different digit pulse) rotates the flux further as shown in FIGS. 4C and 4D.

In one specific embodiment of this invention thin film spots of 81 percent Ni, 19 percent Fe (by weight), 1,000 Angstrom units thick and having a diameter of 30 mils are deposited by well known deposition techniques on a substrate of glass. Copper word and digit solenoids are positioned each with return paths on the opposite side of the substrate. Naturally the solenoids are insulated from one another. Positive word pulses having amplitudes of 120 millamperes and durations of 50 nanoseconds are applied, followed by appropriately applied digit pulses in the manner of the prior art. The digit pulses have amplitudes of 10 milliamperes and durations of 100 nanoseconds. In response to next succeeding word pulses, in the manner of the prior art, positive and negative output pulses having amplitudes of ±1.0 millivolt and durations of 50 nanoseconds are observed. When negative word pulses are applied concurrently with the digit pulses as described, in accordance with this invention, positive and negative output pulses having amplitudes of ±1.2 millivolts and durations of 50 nanoseconds were observed, an increase of about 20 percent over the prior art signals.

The invention has been described in terms of illustrative compatible pulse polarities. The opposite pulse polarities may be employed, however, necessitating only the reversal of the description for the storing and reading of binary ones and zeros.

What has been described is considered to be only illustrative of the principles of this invention and it is to be understood that numerous other arrangements may be devised by one skilled in the art without departing from the spirit and scope of this invention.

What is claimed is:

1. In combination, thin film magnetic storage means of a material characterized by hard and easy axes, said storage means including first means for selectively applying first and second consecutive fields of first and second polarities respectively for rotating flux in selected portions of said storage medium to first and second directions along said hard axis consecutively and second means for applying to said selected portions a concurrent third field for rotating flux in said selected portions of said storage means to a first direction along said easy axis when said second field terminates.

2. A combination in accordance with claim 1 wherein said portions of said magnetic storage means comprise a plurality of discrete thin film spots.

3. A combination in accordance with claim 2, said second means including means for applying said third field before said first field terminates.

4. A comibnation in accordance with claim 2 including means for applying said third field before said first field terminates, means for applying said second field after said first field terminates, and means for terminating said second field before said third field terminates.

5. A combination in accordance with claim 2, said second means including means for applying a third field concurrently with each of said first and second fields.

6. A combination in accordance with claim 5 including means for terminating said first and second fields before terminating concurrent third fields.

7. A combination in accordance with claim 5 wherein said second field is smaller in amplitude than said first field and said third field is smaller in amplitude than said second.

References Cited

UNITED STATES PATENTS

| | | | |
|---|---|---|---|
| 3,278,914 | 10/1966 | Rashleigh et al. | 340—174 |
| 3,293,620 | 12/1966 | Renard | 340—174 |
| 3,320,597 | 5/1967 | Hart | 340—174 |
| 3,321,749 | 5/1967 | Overn | 340—174 |

BERNARD KONICK, *Primary Examiner.*

B. L. HALEY, *Assistant Examiner.*